United States Patent
Sun et al.

(10) Patent No.: US 9,161,308 B2
(45) Date of Patent: Oct. 13, 2015

(54) DEVICES AND METHODS FOR FACILITATING AUTONOMOUS DISCONTINUOUS TRANSMISSION IN ACCESS TERMINALS

(71) Applicant: QUALCOMM Incorporated, San Diego, CA (US)

(72) Inventors: Jing Sun, San Diego, CA (US); Rashid Ahmed Akbar Attar, San Diego, CA (US); Christopher Gerard Lott, San Diego, CA (US); Joseph B. Soriaga, San Diego, CA (US); Jun Hu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 66 days.

(21) Appl. No.: 14/010,209

(22) Filed: Aug. 26, 2013

(65) Prior Publication Data

US 2015/0055528 A1    Feb. 26, 2015

(51) Int. Cl.
*H04W 52/02* (2009.01)
*H04W 76/04* (2009.01)
*H04W 52/44* (2009.01)
*H04W 52/14* (2009.01)

(52) U.S. Cl.
CPC ........ *H04W 52/0251* (2013.01); *H04W 76/048* (2013.01); *H04W 52/146* (2013.01); *H04W 52/44* (2013.01)

(58) Field of Classification Search
CPC ................................................ H04W 52/0261
See application file for complete search history.

(56) References Cited

U.S. PATENT DOCUMENTS

| | | | |
|---|---|---|---|
| 6,137,789 A * | 10/2000 | Honkasalo | 370/342 |
| 6,278,864 B1 * | 8/2001 | Cummins et al. | 455/73 |
| 6,377,790 B1 | 4/2002 | Ishii | |
| 6,493,326 B1 * | 12/2002 | Ramachandran | 370/311 |
| 6,545,989 B1 | 4/2003 | Butler | |
| 6,842,438 B1 * | 1/2005 | Benedict et al. | 370/328 |
| 7,039,358 B1 | 5/2006 | Shellhammer et al. | |
| 7,126,945 B2 | 10/2006 | Beach | |
| 7,916,675 B2 | 3/2011 | Dalsgaard et al. | |

(Continued)

FOREIGN PATENT DOCUMENTS

| AU | 2004202732 A1 | 7/2004 |
|---|---|---|
| EP | 1932380 A2 | 6/2008 |

(Continued)

OTHER PUBLICATIONS

International Search Report and Written Opinion—PCT/US2014/052404—ISA/EPO—Feb. 19, 2015.

(Continued)

*Primary Examiner* — Mohammad Anwar
(74) *Attorney, Agent, or Firm* — Loza & Loza LLP

(57) ABSTRACT

Access terminals are adapted to facilitate discontinuous transmission (DTX) employable during active transmissions. According to one example, an access terminal may be actively transmitting a plurality of frames on a reverse link channel. The access terminal can autonomously implement a DTX operation during the active reverse link transmissions, in which a transmitter circuit is powered down for periods of time less than a duration of one frame. As a result, reverse link transmissions are punctured during the powered down periods. Other aspects, embodiments, and features are also included.

20 Claims, 12 Drawing Sheets

(56) References Cited

U.S. PATENT DOCUMENTS

| | | | |
|---|---|---|---|
| 7,941,626 B2 | 5/2011 | Marinier et al. | |
| 8,077,647 B2 | 12/2011 | Wentink | |
| 8,094,595 B2 | 1/2012 | Montojo et al. | |
| 8,098,635 B2 | 1/2012 | Montojo et al. | |
| 8,254,977 B2 | 8/2012 | Fernandez-Corbaton et al. | |
| 8,255,708 B1 | 8/2012 | Zhang | |
| 8,792,407 B2 | 7/2014 | Hu et al. | |
| 8,797,911 B2 | 8/2014 | He et al. | |
| 2001/0015963 A1 | 8/2001 | Tuomainen et al. | |
| 2003/0152049 A1 | 8/2003 | Turner | |
| 2003/0235171 A1 | 12/2003 | Lundstrom et al. | |
| 2004/0017792 A1 | 1/2004 | Khaleghi et al. | |
| 2004/0039985 A1* | 2/2004 | Mikkola et al. | 714/776 |
| 2005/0009578 A1 | 1/2005 | Liu | |
| 2005/0094816 A1 | 5/2005 | Lindoff et al. | |
| 2005/0237984 A1 | 10/2005 | Benveniste | |
| 2006/0105717 A1 | 5/2006 | Kwon et al. | |
| 2006/0183497 A1 | 8/2006 | Paranchych et al. | |
| 2006/0205396 A1 | 9/2006 | Laroia et al. | |
| 2007/0015529 A1* | 1/2007 | Choi et al. | 455/522 |
| 2007/0127403 A1 | 6/2007 | Lu et al. | |
| 2007/0173279 A1 | 7/2007 | Kuroda et al. | |
| 2007/0195723 A1 | 8/2007 | Attar et al. | |
| 2007/0263655 A1 | 11/2007 | Esteves et al. | |
| 2008/0095071 A1 | 4/2008 | Lu et al. | |
| 2008/0132230 A1* | 6/2008 | Marinier et al. | 455/434 |
| 2009/0005127 A1* | 1/2009 | Frenger et al. | 455/574 |
| 2009/0092069 A1 | 4/2009 | Rhee | |
| 2009/0180414 A1 | 7/2009 | Maeda et al. | |
| 2009/0247094 A1 | 10/2009 | Sakoda | |
| 2009/0312060 A1 | 12/2009 | Bloebaum et al. | |
| 2010/0118698 A1* | 5/2010 | Yokobori et al. | 370/230 |
| 2010/0202393 A1 | 8/2010 | Zhang et al. | |
| 2010/0208639 A1 | 8/2010 | Jou et al. | |
| 2010/0214942 A1 | 8/2010 | Du et al. | |
| 2010/0323683 A1 | 12/2010 | Kazmi et al. | |
| 2011/0044221 A1 | 2/2011 | Proctor, Jr. | |
| 2011/0069649 A1 | 3/2011 | Gobriel et al. | |
| 2011/0072285 A1 | 3/2011 | Fischer et al. | |
| 2011/0103301 A1 | 5/2011 | Mueck et al. | |
| 2011/0116427 A1 | 5/2011 | Chang et al. | |
| 2011/0158142 A1 | 6/2011 | Gong et al. | |
| 2011/0170420 A1 | 7/2011 | Xi et al. | |
| 2011/0299426 A1 | 12/2011 | Kumar | |
| 2011/0319064 A1 | 12/2011 | Lenart et al. | |
| 2011/0319072 A1 | 12/2011 | Ekici et al. | |
| 2012/0026939 A1 | 2/2012 | Sindhushayana et al. | |
| 2012/0082079 A1 | 4/2012 | Luo et al. | |
| 2012/0082192 A1 | 4/2012 | Pelletier et al. | |
| 2012/0239956 A1 | 9/2012 | Kwon et al. | |
| 2013/0028092 A1 | 1/2013 | Tong et al. | |
| 2013/0107774 A1 | 5/2013 | Wang et al. | |
| 2013/0107780 A1 | 5/2013 | Choi et al. | |
| 2013/0121172 A1 | 5/2013 | Cheng et al. | |
| 2013/0190027 A1 | 7/2013 | Cao et al. | |
| 2013/0201893 A1 | 8/2013 | Hu et al. | |
| 2013/0205155 A1 | 8/2013 | Yang et al. | |
| 2013/0215788 A1 | 8/2013 | He et al. | |
| 2013/0215812 A1 | 8/2013 | Hu et al. | |
| 2013/0250832 A1 | 9/2013 | Kim et al. | |
| 2013/0316761 A1 | 11/2013 | Ekici et al. | |
| 2014/0105085 A1 | 4/2014 | Hu et al. | |
| 2014/0135022 A1 | 5/2014 | Frenger et al. | |
| 2014/0226550 A1 | 8/2014 | He et al. | |
| 2014/0247761 A1 | 9/2014 | Hu | |
| 2014/0254452 A1 | 9/2014 | Golitschek et al. | |

FOREIGN PATENT DOCUMENTS

| | | |
|---|---|---|
| EP | 2320692 A1 | 5/2011 |
| EP | 2398285 A1 | 12/2011 |
| GB | 2493713 A | 2/2013 |
| WO | 2007025138 A2 | 3/2007 |
| WO | WO-2007148198 A2 | 12/2007 |

OTHER PUBLICATIONS

Rashid Attar QUALLCOMM Incorporated (858) 651-1553 RAT-TARTHETAUALCOMM COM: "Battery life Improvements for 1xEVDO Revision A terminals", 3GPP2 Draft; C30-20050516 053__QCOM_T_Terminal_Battery_Life Improvement, 3rd Generation Partnership Project 2, 3GPP2, 2500 Wilson Boulevard, Suite 300, Arlington, Virginia 22201; USA, vol. TSGC May 20, 2005, pp. 1-7, XP062155768, Retrieved from the Internet: URL:http://ftp.3gpp2.org/TSGC/Working/2005/2005-05-Portland/TSGC-2005-05-Portland/WG3/ [retrieved on May 20, 2005].

* cited by examiner

Half-Slot Index   0  1  2  3  4  5  6  7   ← 202
    Subframe 0
    Subframe 1
    Subframe 2
    Subframe 3

FIG. 9

Half-Slot Index   0  1  2  3  4  5  6  7   ← 202
    Subframe 0
    Subframe 1
    Subframe 2
    Subframe 3

FIG. 10

Repetition Pattern

| 0 | 1 | 2 | 3 | 4 | 5 | 6 | 7 |
|---|---|---|---|---|---|---|---|
| 8 | 9 | 10 | 11 | 12 | 13 | 14 | 0 |
| 1 | 2 | 3 | 4 | 5 | 6 | 7 | 8 |
| 9 | 10 | 11 | 12 | 13 | 14 | 0 | 1 |

- Each Block is a Halfslot

Slot Index

| 0 | 1 | 2 | 3 |
|---|---|---|---|
| 4 | 5 | 6 | 7 |
| 8 | 9 | 10 | 11 |
| 12 | 13 | 14 | 15 |

- Each Block is a slot

Slot-Specific Rules
- General Rules
- 8 ~ !1
- 9 ~ !1 & !2
- 10 ~ !2 & !3
- 11 ~ !3 & !4
- 12 ~ !4 & !5
- 13 ~ !5 & !6
- 14 ~ !6 & !7
- 15 ~ !0 | (!7 & !8)

FIG. 11

Repetition Pattern

| 0 | 1 | 2 | 3 | 4 | 5 | 6 | 7 |
|---|---|---|---|---|---|---|---|
| 8 | 9 | 10 | 11 | 12 | 13 | 14 | 15 |
| 0 | 1 | 2 | 3 | 4 | 5 | 6 | 7 |
| 8 | 9 | 10 | 11 | 12 | 13 | 14 | 15 |

- Each Block is a Halfslot

Slot Index

| 0 | 1 | 2 | 3 |
|---|---|---|---|
| 4 | 5 | 6 | 7 |
| 8 | 9 | 10 | 11 |
| 12 | 13 | 14 | 15 |

- Each Block is a slot

Slot-Specific Rules
- General Rules
- 8 ~ !0
- 9 ~ !1
- 10 ~ !2
- 11 ~ !3
- 12 ~ !4
- 13 ~ !5
- 14 ~ !6
- 15 ~ !7

FIG. 12

Repetition Pattern

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 0 | 1 | 2 | 3 |
| 4 | 5 | 6 | 7 | 8 | 9 | 10 | 11 |

- Each Block is a Halfslot

Slot Index

| 0 | 1 | 2 | 3 |
|---|---|---|---|
| 4 | 5 | 6 | 7 |
| 8 | 9 | 10 | 11 |
| 12 | 13 | 14 | 15 |

- Each Block is a slot

Slot-Specific Rules
- General Rules
- Slots 6, 7, 8, and 9 cannot be punctured
- 10 ~ !0
- 11 ~ !1
- 12 ~ !2
- 13 ~ !3
- 14 ~ !4
- 15 ~ !5

FIG. 13

Repetition Pattern

| 0 | 1 | 2 | 3 | 4 | 5 | 6 | 7 |
|---|---|---|---|---|---|---|---|
| 8 | 9 | 0 | 1 | 2 | 3 | 4 | 5 |
| 6 | 7 | 8 | 9 | 0 | 1 | 2 | 3 |
| | | | | | | | |

- Each Block is a Halfslot

Slot Index

| 0 | 1 | 2 | 3 |
|---|---|---|---|
| 4 | 5 | 6 | 7 |
| 8 | 9 | 10 | 11 |
| | | | |

- Each Block is a slot

Slot-Specific Rules
- General Rules
- 5 ~ !0
- 6 ~ !1
- 7 ~ !2
- 8 ~ !3
- 9 ~ !4
- 10 ~ !0 | !5
- 11 ~ !1 | !6

FIG. 14

Repetition Pattern

| 0 | 1 | 2 | 3 | 4 | 5 | 6 | 7 |
|---|---|---|---|---|---|---|---|
| 8 | 9 | 10 | 11 | 12 | 13 | 14 | 0 |
| 1 | 2 | 3 | 4 | 5 | 6 | 7 | 8 |
| 9 | 10 | 11 | 12 | 13 | 14 | 0 | 1 |

- Each Block is a Halfslot

Slot Index

|  |  |  | 0 | 1 |  |
|---|---|---|---|---|---|
|  |  |  | 2 | 3 |  |
|  |  |  | 4 | 5 |  |
|  |  |  | 6 | 7 |  |

- Each numbered block is a $2^{nd}$ halfslot of a previous slot and a $1^{st}$ halfslot of a subsequent slot

Slot-Specific Rules
- General Rules
- 4 ~ !0 & !1
- 5 ~ !1
- 6 ~ !2 & !3
- 7 ~ !3

FIG. 15

Repetition Pattern

| 0 | 1 | 2 | 3 | 4 | 5 | 6 | 7 |
|---|---|---|---|---|---|---|---|
| 8 | 9 | 10 | 11 | 12 | 13 | 14 | 15 |
| 0 | 1 | 2 | 3 | 4 | 5 | 6 | 7 |
| 8 | 9 | 10 | 11 | 12 | 13 | 14 | 15 |

- Each Block is a Halfslot

Slot Index

|  |  |  | 0 | 1 |  |
|---|---|---|---|---|---|
|  |  |  | 2 | 3 |  |
|  |  |  | 4 | 5 |  |
|  |  |  | 6 | 7 |  |

- Each numbered block is a $2^{nd}$ halfslot of a previous slot and a $1^{st}$ halfslot of a subsequent slot

Slot-Specific Rules
- General Rules
- 4 ~ !0
- 5 ~ !1
- 6 ~ !2
- 7 ~ !3

FIG. 16

Repetition Pattern

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 0 | 1 | 2 | 3 |
| 4 | 5 | 6 | 7 | 8 | 9 | 10 | 11 |

- Each Block is a Halfslot

Slot Index

|   |   |   | 0 | 1 |   |
|---|---|---|---|---|---|
|   |   |   | 2 | 3 |   |
|   |   |   | 4 | 5 |   |
|   |   |   | 6 | 7 |   |

- Each numbered block is a 2$^{nd}$ halfslot of a previous slot and a 1$^{st}$ halfslot of a subsequent slot

Slot-Specific Rules
- General Rules
- Slots 2 and 3 cannot be punctured

| RRI | # Modulation Symbols (in slots) | # of repetitions in a frame |
|---|---|---|
| 1 | 1.25 | 12.8 |
| 2 | 2.5 | 6.4 |
| 3 | 5 | 3.2 |
| 4 | 7.5 | 2.13 |
| 5 | 10 | 1.6 |
| 6 | 7.5 | 2.13 |
| 7 | 10 | 1.6 |
| 8 | 7.5 | 2.13 |
| 9 | 10 | 1.6 |
| 10 | 10 | 1.6 |
| 11 | 13.3 | 1.2 |
| 12 | 8 | 2 |

FIG. 19

DEVICES AND METHODS FOR FACILITATING AUTONOMOUS DISCONTINUOUS TRANSMISSION IN ACCESS TERMINALS

TECHNICAL FIELD

The technology discussed below relates generally to wireless communications, and more specifically, to methods and devices for facilitating discontinuous transmission in access terminals operating in wireless communications systems. Embodiments of the present invention can enable power savings via efficient use of limited power resources.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

Multiple types of devices are adapted to utilize such wireless communications systems. These devices may be generally referred to as access terminals. Access terminals are becoming increasingly popular, with consumers often using power-hungry applications that run on such access terminals. Access terminals are typically battery-powered and the amount of power a battery can provide between charges is generally limited. Accordingly, features may be desirable to improve the battery life between charges in access terminals.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate power conservation by optimizing discontinuous transmission by access terminals operating within a wireless communications system.

According to at least one aspect of the disclosure, access terminals may include a communications interface with a transmitter circuit. A processing circuit may be coupled to the communications interface, and the processing circuit may be adapted to actively transmit a plurality of frames on a reverse link channel via the transmitter circuit. The processing circuit may further be adapted to autonomously implement a discontinuous transmission (DTX) operation during the active reverse link transmissions, where the transmitter circuit is powered down for periods of time less than a duration of one frame, and reverse link transmissions are punctured during the powered down periods.

Further aspects provide methods operational on access terminals and/or access terminals including means to perform such methods. One or more examples of such methods may include actively transmitting a plurality of frames on a reverse link channel, and autonomously implementing a discontinuous transmission (DTX) operation during the active reverse link transmissions. The DTX operation can include powering down a transmitter circuit for periods of time less than a duration of one frame, such that portions of a frame are punctured during the powered down periods.

Still further aspects include processor-readable storage mediums comprising programming executable by a processing circuit. According to one or more examples, such programming may be adapted for causing the processing circuit to actively transmit a plurality of frames on a reverse link channel. The programming may further be adapted for causing the processing circuit to autonomously implement a discontinuous transmission (DTX) operation during the active reverse link transmissions, wherein a transmitter circuit is powered down for periods of time less than a duration of one frame, and portions of a frame are punctured during the powered down periods.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 4 is a block diagram illustrating an autonomous traffic DTX operation utilizing a fixed DTX pattern according to some embodiments.

FIG. 5 is a block diagram illustrating a fixed DTX pattern with an alternating offset according to some embodiments.

FIG. 9 is a block diagram illustrating a fixed DTX pattern that may be applied in combination with the network DTX pattern in FIG. 8 for RRIs 5, 7, 9, and 10 according to some embodiments.

FIG. 10 is a block diagram illustrating a fixed DTX pattern that may be applied in combination with the network DTX pattern in FIG. 8 for RRIs 1-4, 6, 8, 11, and 12 according to some embodiments.

FIG. 11 includes block diagrams illustrating a repetition pattern and a slot index for a 7.5-slot RRI, together with the specific slot rules employable when a network DTX operation is not implemented with the autonomous traffic DTX operation according to some embodiments.

FIG. 12 includes block diagrams illustrating a repetition pattern and slot index for an 8-slot RRI, together with the specific slot rules employable when a network DTX operation is not implemented with the autonomous traffic DTX operation according to some embodiments.

FIG. 13 includes block diagrams illustrating a repetition pattern and slot index for a 10-slot RRI, together with the specific slot rules employable when a network DTX operation is not implemented with the autonomous traffic DTX operation according to some embodiments.

FIG. 14 includes block diagrams illustrating a repetition pattern and slot index for a 5-slot RRI, together with the specific slot rules employable when a network DTX operation is not implemented with the autonomous traffic DTX operation according to some embodiments.

FIG. 15 includes block diagrams illustrating a repetition pattern and a slot index for a 7.5-slot RRI, together with the specific slot rules employable when a network DTX operation is also implemented with the autonomous traffic DTX operation according to some embodiments.

FIG. 16 includes block diagrams illustrating a repetition pattern and a slot index for a 8-slot RRI, together with the specific slot rules employable when a network DTX operation is also implemented with the autonomous traffic DTX operation according to some embodiments.

FIG. 19 is a table illustrating the numbers of modulation symbols and different numbers of repetitions in a frame for RRIs associated with EV-DO Rev. A and above.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for CDMA Evolution-Data Optimized (EV-DO) and 3rd Generation Partnership Project 2 (3GPP2) protocols and systems, and related terminology may be found in much of the following description. However, those of ordinary skill in the art will recognize that one or more aspects of the present disclosure may be employed and included in one or more other wireless communication protocols and systems, including various 3GPP and 3GPP2 protocols and systems.

Figure 1:
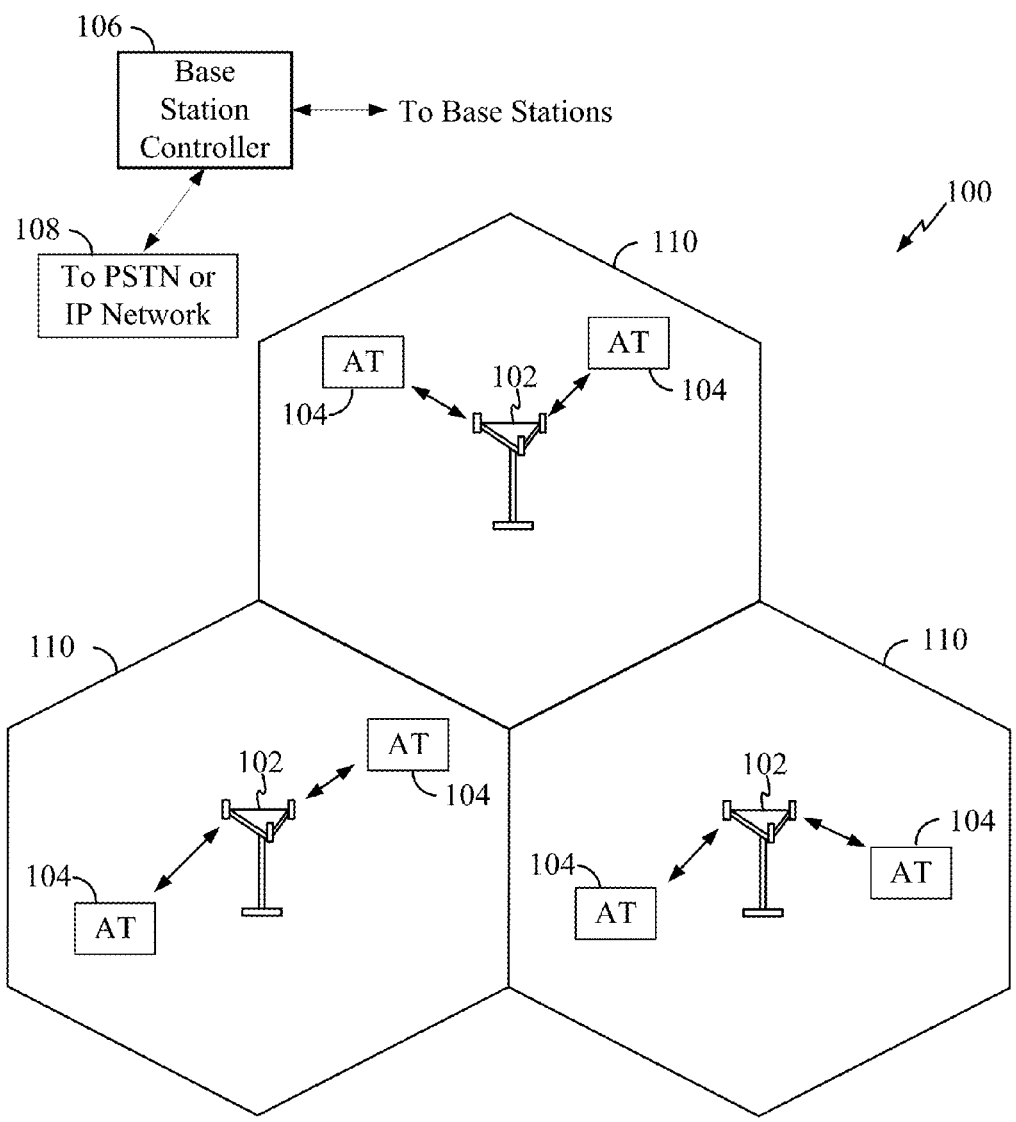
FIG. 1 is a block diagram of a network environment in which one or more aspects of the present disclosure may find application.

Referring now to FIG. 1, a block diagram of a network environment in which one or more aspects of the present disclosure may find application is illustrated. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106. Each of the base stations 102 can provide communication coverage for a respective geographic area, identified as respective coverage areas 110 for each base station 102. The coverage area 110 for a base station 102 may be divided into sectors (not shown, but making up only a portion of the coverage area). In various examples, the system 100 may include base stations 102 of different types.

One or more access terminals 104 may be dispersed throughout the coverage areas 110. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, an automobile, and/or other communication/computing device which communicates, at least partially, through a wireless or cellular network.

Figure 2:
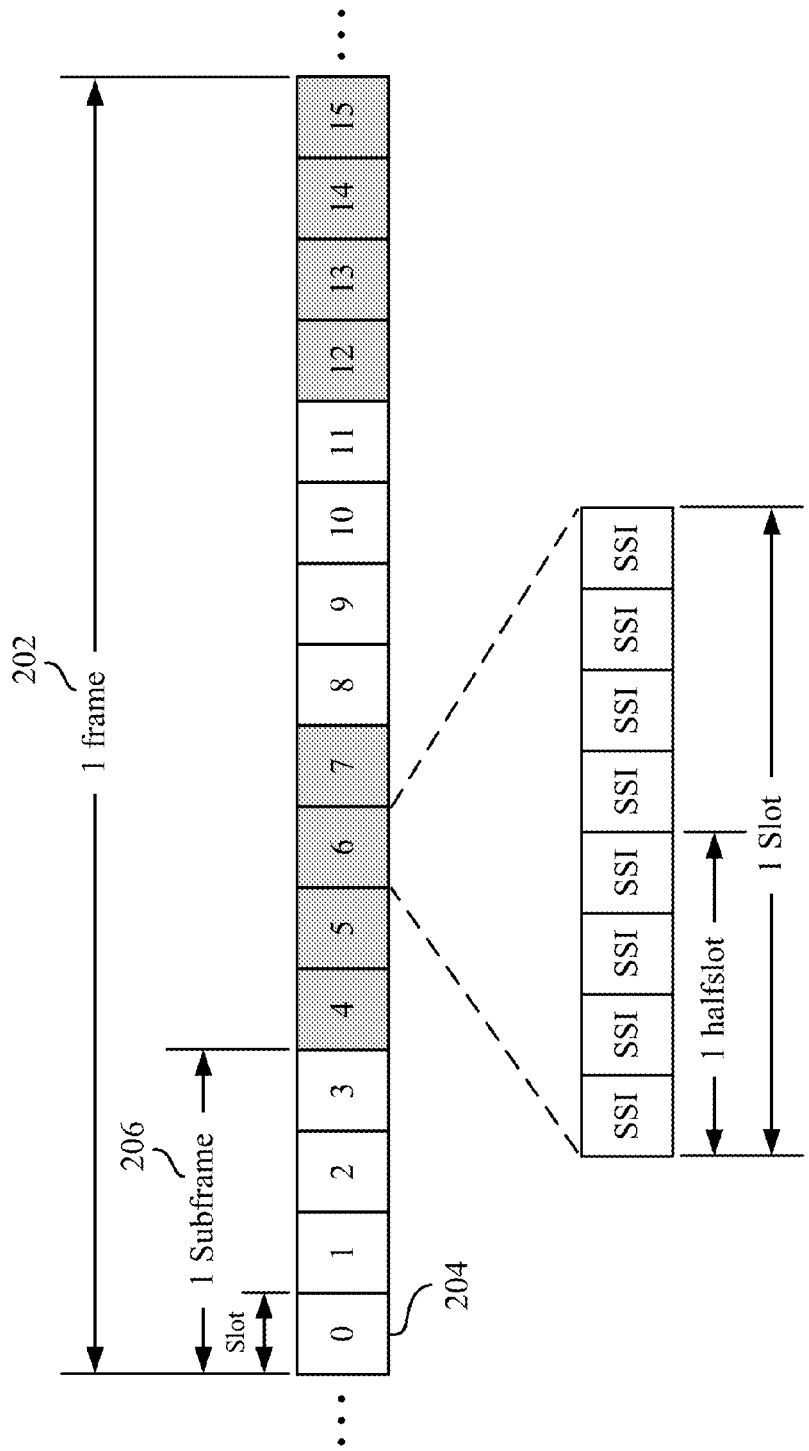
FIG. 2 is a block diagram illustrating an example of a reverse link frame according to some embodiments.

As access terminals 104 operate within the wireless communications system 100, the access terminals 104 can communicate with a base station 102 by transmitting and receiving packetized data. In one example, the packetized data is transmitted by an access terminal 104 on the reverse link by organizing data into transmission frames. FIG. 2 illustrates an example of a reverse link frame according to at least one example. In this example, the reverse link frame 202 is shown for an EV-DO wireless communications protocol and system. As shown, each reverse link frame 202 is divided into sixteen equal periods called "timeslots" or "slots" 204. An access terminal 104 generally transmits sub-packets occupying four reverse link slots 204 (eight reverse link half-slots), where the four reverse link slots are called a reverse link "subframe" 206. Thus, a subframe 206, includes four slots 204 (or eight half slots). Each slot 204 includes eight symbol segment indexes (SSI), referred to herein as symbols.

Within each slot, a pilot, an RRI channel, and a DRC channel are each transmitted continuously. Further, an auxiliary pilot is continuously transmitted if the data rate exceeds a certain threshold. An acknowledgment (ACK) may be transmitted in the first half of a slot when there is a forward link slot to acknowledge. A DSC channel is typically transmitted in the second half of a slot.

Among the overhead channels, the RRI is spread over the entire frame. The DRC is spread over the DRC length of slots, and can be relatively long. The DSC is spread over the DSC length of slots, and can also be relatively long. Any ACK is typically not repeated, and it may be desirable that ACK messages are not punctured (or at least that any puncturing is kept to a minimum), so as not to substantially affect forward link performance.

As an access terminal 104 operates in an active mode, an active reverse link (uplink) transmission may be maintained. Such an active reverse link transmission may include a pilot channel for reverse link channel estimation, an overhead channel to support the traffic channel, and a data channel if there is something to be transmitted. Typically, the transmission is continuous such that various components of a communications interface for the access terminal 104 (e.g., a power amplifier) are always ON.

Such an always ON configuration can be burdensome on the limited battery power associate with an access terminal 104, such that the battery life may be significantly reduced. Thus, discontinuous transmission (DTX) schemes have been introduced to reduce power consumption by powering down components of the transmitter for periods of time. These conventional DTX schemes may be referred to herein as network DTX, since the access terminal 104 employs such a DTX scheme through coordination with the network. Typically, the access terminal 104 negotiates with a base station 102 to employ a network DTX scheme so the base station 102 is aware of the structure of the DTX pattern employed by the access terminal 104. However, these negotiations take time and power such that a negotiated network DTX scheme may only make sense when the DTX operation will continue for an extended period of time. Furthermore, such network DTX schemes are only possible when the base station 102 supports DTX modes.

In some instances, access terminals 104 may be adapted to employ an autonomous DTX when there is no active data transmissions. However, conventional autonomous DTX is typically limited to instances where there is no active data transmissions (e.g., no forward link and no reverse link traffic).

According to at least one aspect of the disclosure, access terminals are adapted to facilitate autonomous DTX. The term "autonomous DTX" refers to a DTX mode employed by an access terminal without negotiation with the network, and potentially without the network having any knowledge that the autonomous DTX is being employed by the access terminal. The autonomous DTX mode can be implemented even when there are active data transmissions from the access terminal That is, access terminals of the present disclosure are adapted to implement autonomous DTX schemes even when there is active forward link and/or reverse link traffic. Such features can result in the conservation of significant battery power for the access terminals.

Figure 3:
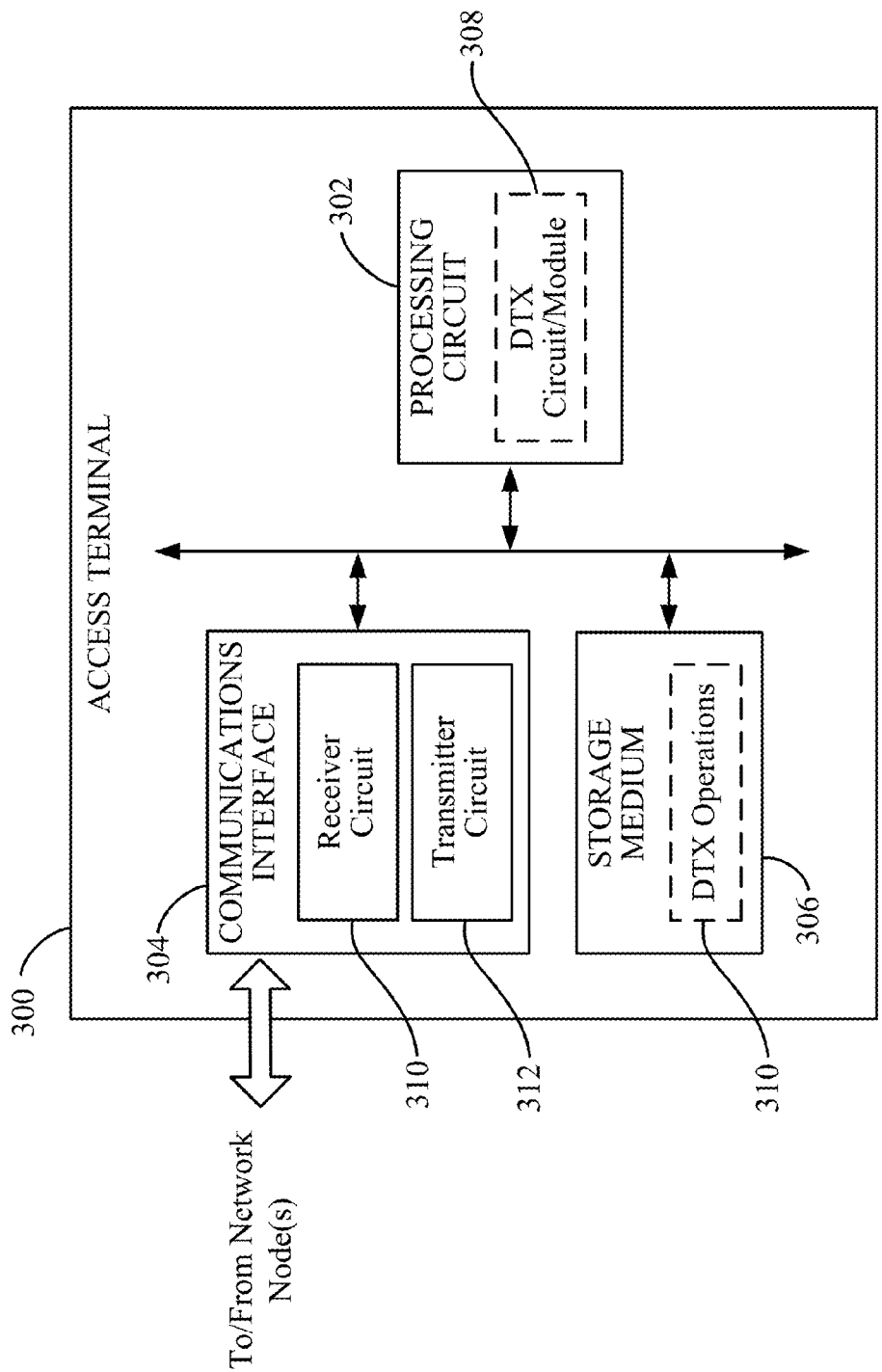
FIG. 3 is a block diagram illustrating select components of an access terminal according to some embodiments.

Turning to FIG. 3, a block diagram is shown illustrating select components of an access terminal 300 according to at least one example of the present disclosure. The access terminal 300 includes a processing circuit 302 coupled to or placed in electrical communication with a communications interface 304 and a storage medium 306.

The processing circuit 302 is arranged to obtain, process and/or send data, control data access and storage, issue commands, and control other desired operations. The processing circuit 302 may include circuitry adapted to implement desired programming provided by appropriate media in at least one example. For example, the processing circuit 302 may be implemented as one or more processors, one or more controllers, and/or other structure configured to execute executable programming Examples of the processing circuit 302 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 302 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 302 are for illustration and other suitable configurations within the scope of the present disclosure are also contemplated.

The processing circuit 302 is adapted for processing, including the execution of programming, which may be stored on the storage medium 306. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 302 may include a discontinuous transmission (DTX) circuit or module 308. The DTX circuit/module 308 may include circuitry and/or programming (e.g., programming stored on the storage medium 306) adapted to implement an autonomous DTX scheme on the access terminal 300 when there are active data transmissions.

The communications interface 304 is configured to facilitate wireless communications of the access terminal 300. For example, the communications interface 304 may include circuitry and/or programming adapted to facilitate the communication of information bi-directionally with respect to one or more wireless network devices (e.g., network nodes). The communications interface 304 may be coupled to one or more antennas (not shown), and includes wireless transceiver circuitry, including at least one receiver circuit 310 (e.g., one or more receiver chains) and/or at least one transmitter circuit 312 (e.g., one or more transmitter chains).

The storage medium 306 may represent one or more computer-readable, machine-readable, and/or processor-readable devices for storing programming, such as processor executable code or instructions (e.g., software, firmware), electronic data, databases, or other digital information. The storage medium 306 may also be used for storing data that is manipulated by the processing circuit 302 when executing programming. The storage medium 306 may be any available media that can be accessed by a general purpose or special purpose processor, including portable or fixed storage devices, optical storage devices, and various other mediums capable of storing, containing and/or carrying programming. By way of example and not limitation, the storage medium 306 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 306 may be coupled to the processing circuit 302 such that the processing circuit 302 can read information from, and write information to, the storage medium 306. That is, the storage medium 306 can be coupled to the processing circuit 302 so that the storage medium 306 is at least accessible by the processing circuit 302, including examples where the storage medium 306 is integral to the processing circuit 302 and/or examples where the storage medium 306 is separate from the processing circuit 302 (e.g., resident in the access terminal 300, external to the access terminal 300, distributed across multiple entities).

Programming stored by the storage medium 306, when executed by the processing circuit 302, causes the processing circuit 302 to perform one or more of the various functions and/or process steps described herein. For example, the storage medium 306 may include discontinuous transmission (DTX) operations 314 adapted to cause the processing circuit 302 to autonomously implement a DTX scheme adapted to be used when there are active transmissions, as described herein. Thus, according to one or more aspects of the present disclosure, the processing circuit 302 is adapted to perform (in conjunction with the storage medium 306) any or all of the processes, functions, steps and/or routines for any or all of the access terminals (e.g., access terminal 104, access terminal 300) described herein. As used herein, the term "adapted" in relation to the processing circuit 302 may refer to the processing circuit 302 being one or more of configured, employed, implemented, and/or programmed (in conjunction with the storage medium 306) to perform a particular process, function, step and/or routine according to various features described herein.

In operation, the access terminal 300 (e.g., the DTX circuit/module 308 executing the DTX operations 310) is adapted to autonomously enable DTX operations, wherein one or more components of the transmitter circuit 312 are powered down for a relatively short period of time. During active communications, data is generally transmitted by the access terminal 300 when the data is available. The data is typically coded and repeated over an entire frame (e.g., all sixteen slots). For instance, the data transmitted by the access terminal 300 on each frame is typically convolutionally coded to compensate for bit errors by selectively introducing redundant bits into the transmitted data. These redundant bits allow detection and correction of bit errors in the received data. Thus, even if one or two symbols are lost or corrupted during transmission, the data can still be obtained by the receiving device from the symbols that were not lost. Indeed, in some instances, one or more symbols may be purposefully removed from the transmitted data using a conventional process typically referred to as puncturing.

During active data transmissions one or more symbols may be punctured by the access terminal 300 when the transmitter circuit 312 is powered down for the autonomous DTX operations. However, the redundancy introduced by the coding processes can ensure that the data is not completely lost at the receiving device. In some instances, the access terminal 300 may boost the transmit power employed to transmit the data when the transmitter circuit 312 is powered up to maintain the same packet error rate as if no DTX operations were employed. Such boosted transmit power during the powered up phases of the DTX operations may result in a slight increase in current consumption during these periods. However, in general the power savings facilitated by the DTX periods of powering down the transmitter circuit can still result in a net power savings.

According to various examples, the autonomous DTX pattern may employ a DTX period (e.g., the period of time when the transmitter circuit 312 is powered down) that is less than the duration of one frame. The length of the DTX period when the transmitter circuit 312 is powered down compared to the length of time when the transmitter circuit 312 is powered up can have some effect on the performance of the autonomous DTX. If the transmitter circuit 312 is powered up and down too frequently, the out of band emissions can deteriorate. The period of time the transmitter circuit 312 is powered up can be referred to as the duty cycle. In general, a larger duty cycle may result in a decrease in power savings at the access terminal 300. A smaller duty cycle may result in increased channel estimation loss (e.g., Eb/Nt loss) on the reverse link and an increase in transmit power during the periods when the transmitter circuit 312 is powered up.

The autonomous DTX operations described herein with such DTX periods can be referred to generally as autonomous traffic DTX operations, since relatively thin portions of the data is not be transmitted (e.g., is punctured) in a manner that the DTX operations can be implemented during active traffic. Because portions of the data are punctured by the autonomous traffic DTX operations described herein, the access terminal 300 may avoid puncturing as part of the coding process so that too much data is not punctured.

Figures 4, 5:
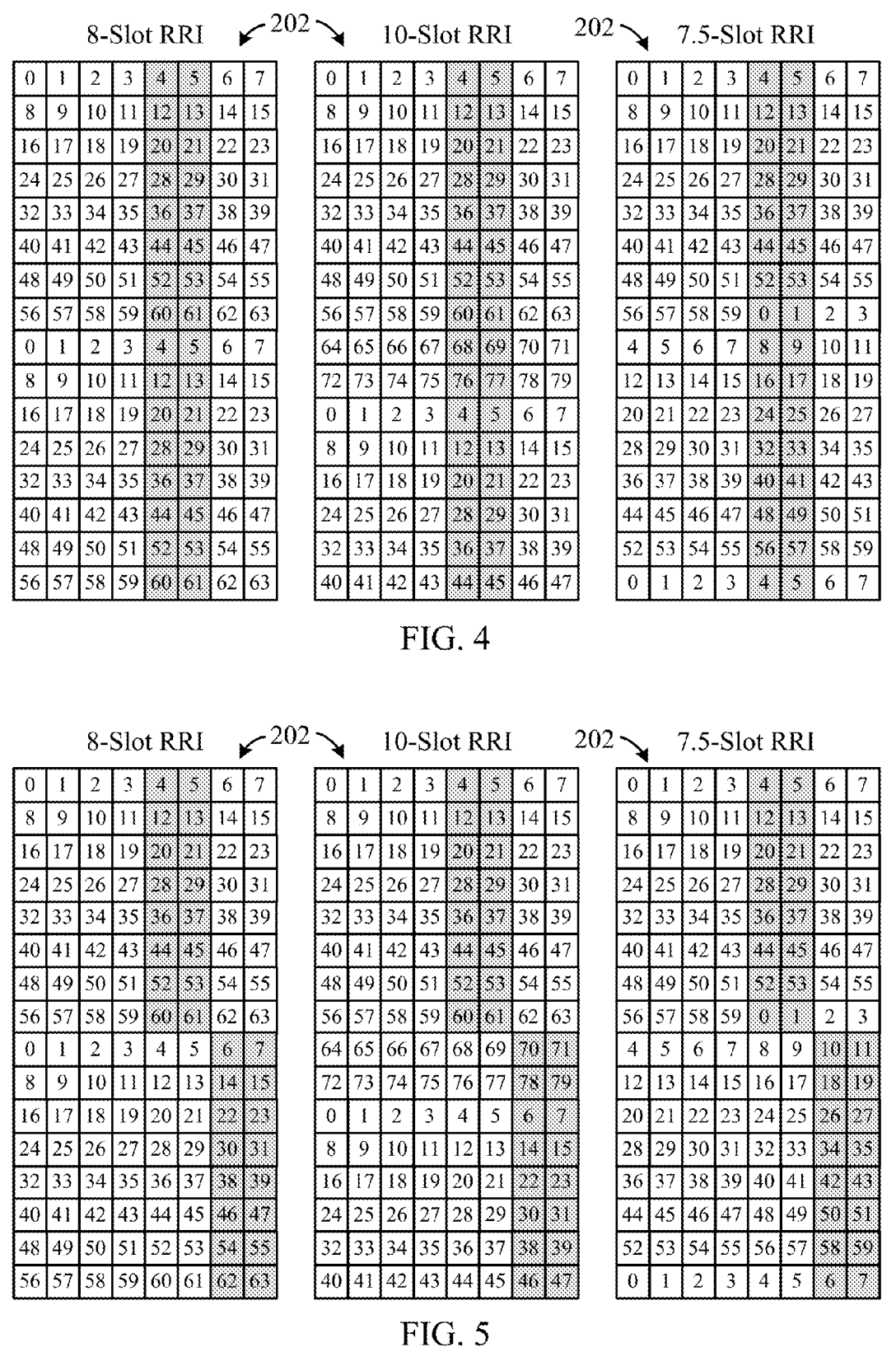

In a first example, the access terminal 300 may employ an autonomous traffic DTX operation utilizing a fixed DTX pattern, in which a fixed pattern of ON and OFF periods are employed, even during active transmissions. FIG. 4 is a block diagram illustrating an autonomous traffic DTX operation utilizing a fixed DTX pattern according to at least one example. In the block diagram, each of the large rectangles represents a frame 202. Each row represents a single slot, and there are sixteen rows representing the sixteen slots in a frame 202. Each individual block is indicated by a number, where each number represents the symbol segment index (referred to herein as a symbol). As shown, the frame has a repetition of the symbol segment index, which corresponds to a particular transmission format. For EV-DO Rev. A and above, there are twelve transmission formats having different numbers of information bits, coding, modulation, etc., as indicated by the Reverse-link Rate Index (RRI). That is, information bits are coded and mapped to modulation symbols, and repetition is used to fill in all sixteen slots in a frame. Different RRIs have different numbers of modulation symbols and different numbers of repetitions in a frame, as illustrated in the table of FIG. 19.

The examples shown in FIG. 4 illustrates examples of implementations of a fixed DTX pattern for an 8-slot RRI (e.g., RRI 12), a 10-slot RRI (e.g., RRIs 5, 7, 9, and 10), and a 7.5-slot RRI (e.g., RRIs 4, 6, and 8). As shown, a fixed DTX pattern can be configured to cause the access terminal 300 to employ a fixed DTX period. That is, the duration of the DTX ON period may be a predefined number of chips during which the one or more components of the transmitter circuit 312 are powered down. Furthermore, the offset between the start of DTX ON periods may be a fixed number of chips. The symbol blocks that are shaded indicate that the DTX is ON during the transmission of the corresponding symbol, such that the corresponding symbol is effectively punctured (e.g., not transmitted). Thus, in the depicted example, the DTX period is fixed at about two symbols in duration, while the fixed offset is about 1024 chips.

In the example of FIG. 4 of a fixed DTX pattern, some symbols may be completely punctured. For example, in the 8-slot RRI and the 10-slot RRI, FIG. 4 shows that some of the symbols are punctured on each occurrence (e.g., symbols 4 and 5). For the 7.5-slot RRI, however, none of the symbols are completely punctured. In some examples, the access terminal 300 may accordingly employ a fixed DTX operation adapted to change the offset one or more times for each frame according to a fixed pattern. Such alternating patterns can avoid complete puncturing of any particular symbol. FIG. 5 illustrates such an alternating fixed DTX pattern according to at least one example. In the depicted example, the access terminal 300 is employing the same DTX period as the example depicted in FIG. 4 (e.g., a DTX period of two symbols). In this example, however, the DTX operation employs different offsets during different portions of the frame. For instance, the first two subframes (e.g., first eight slots) are employing the same 1024 chip offset employed in the fixed DTX example of FIG. 4. Between the second subframe and the third subframe (e.g., between the eighth slot and the ninth slot), an offset of 1536 chips is employed, as shown by the shifted puncture pattern in FIG. 5. By implementing a fixed DTX pattern that alternates, all symbols appear at least once, and no symbols are completely punctured for all three RRI examples (e.g., 8-slot RRI, 10-slot RRI, and 7.5-slot RRI).

Although specific examples of DTX periods and offsets are described above for the examples of fixed DTX patterns, it is noted that other examples may employ shorter DTX periods (e.g., 1 symbol), or longer DTX periods (e.g., 3 or more symbols), as well as different offsets. As noted above, it has been observed that the larger the DTX period is, the smaller any channel estimation loss (Eb/Nt loss) will be experienced. Additionally, there is less overhead for powering down and powering up the components of the transmitter circuit 312. However, it is also typically desirable to avoid puncturing an ACK transmission, which are typically transmitted in the first halfslot for a given slot. Therefore, the access terminal 300 can employ a DTX period limited to a maximum of about 512 chips.

In other instances, however, the access terminal 300 may employ an autonomous traffic DTX operation with a period greater than 512 chips. In such examples, the access terminal 300 can employ another example of an autonomous traffic DTX operation using a fixed DTX pattern, whereby the access terminal 300 can still avoid puncturing an ACK if present.

In the previous examples of autonomous traffic DTX operations, the first halfslots (e.g., the first four symbols of each slot) are not punctured to avoid the possibility that an ACK may be punctured or partially punctured. However, such ACKs are generally transmitted when there is a need to acknowledge a forward link slot. Typically, there exists a likely possibility that the access terminal 300 will have one or more slots without any ACK to be transmitted. The access terminal 300 can accordingly employ an autonomous traffic DTX operation utilizing a fixed DTX pattern, where the fixed DTX pattern can be actively overridden to avoid puncturing any symbols associated with an ACK transmission.

Figure 6:
FIG. 6 is a block diagram illustrating an autonomous traffic DTX operation according to some embodiments in which the fixed DTX pattern can be actively overridden in response to a scheduled ACK transmission.
Figure 7:
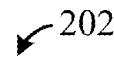
FIG. 7 is a simplified block diagram illustrating the same autonomous traffic DTX operation as FIG. 6 according to some embodiments.

FIG. 6 is a block diagram illustrating an autonomous traffic DTX operation according to an example in which the fixed DTX pattern can be actively overridden in response to a scheduled ACK transmission. The example in FIG. 6 is for an 8-slot RRI. Furthermore, FIG. 7 illustrates the same autonomous traffic DTX operation as FIG. 6 in a simplified diagram that may be applied to any RRI. The diagram in FIG. 7 is different from the diagram in FIG. 6 in that each row in FIG. 7 represents a subframe, and each block represents a halfslot. As noted above with reference to FIG. 2, each frame 202 includes four subframes, and each subframe includes four slots and eight halfslots. The two different diagrams are included herein simply as a visual aid for understanding the correlation between the two types of diagrams used throughout this disclosure.

In the example of FIGS. 6 and 7, an initial fixed DTX pattern is employed where a whole slot is scheduled to be punctured per subframe, as depicted by the shaded blocks representing halfslots that are punctured. If, however, an ACK is scheduled to be transmitted in the slot that is otherwise scheduled to be punctured by powering down the transmitter circuit 312 for the DTX period, the access terminal 300 can decide not to power down the transmitter circuit 312 for the DTX period, or at least for the halfslot during which the ACK is scheduled. That is, the access terminal 300 can skip a scheduled DTX period whenever an ACK is scheduled for transmission during that particular DTX period. In such examples, if the access terminal 300 is always scheduled for transmissions on the forward link, then there may be no DTX, since there would always be an ACK scheduled. On the other hand, if the access terminal 300 were idle on the forward link, the opportunistic DTX operation would follow the defined pattern.

Figure 8:
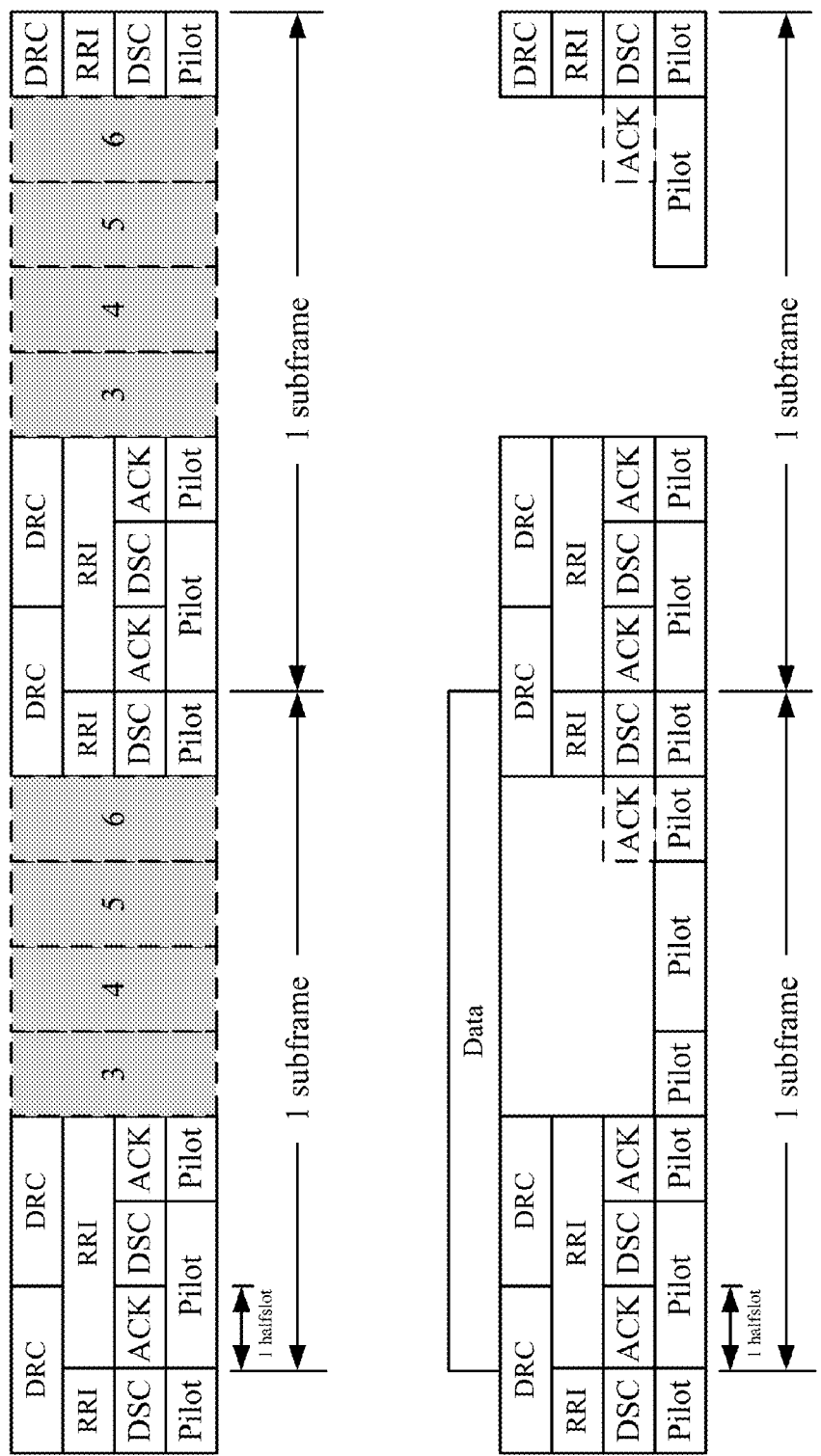
FIG. 8 is a block diagram illustrating an example of a network DTX operation according to some embodiments.

As noted above, conventional access terminals can be adapted to implement network DTX operations in some instances. According to an aspect of the present disclosure, the access terminal 300 can be adapted to implement an autonomous traffic DTX operation in combination with a conventional network DTX operation. In some instances, the network DTX operation may be employed when there is no active data transmissions, while the autonomous traffic DTX operation can be employed during active data transmissions. FIG. 8 is a block diagram illustrating an example of a network DTX operation. In the conventional network DTX, overhead channels are transmitted during halfslots 0, 1, 2, and 7 (out of the eight halfslots 0 through 7). In the top part of the diagram in FIG. 8, when there is no data and no ACK or pilot to be transmitted, the access terminal 300 may power down the transmitter circuit 312 during halfslots 3, 4, 5, and 6 according to the network DTX operation, as shown by the shaded portions of the diagram. If, however, there is data in a subframe, as shown in the lower diagram of FIG. 8, the data may be transmitted by the access terminal 300 over the entire subframe together with a pilot. Further, if there is an ACK to be transmitted, the pilot is transmitted during the same halfslot as the ACK, as well as during the previous halfslot.

In the network DTX example in FIG. 8, the DTX period is configured for the transmitter circuit 312 to be powered down for halfslots 3 and 4 together and for halfslots 5 and 6 together. Accordingly, if there is no ACK in halfslot 4, then the transmitter circuit 312 can be powered down during halfslots 3 and 4. Similarly, when there is no ACK in halfslot 6, the transmitter circuit 312 can be powered down during halfslots 5 and 6. In this example, there is not an entire slot that is to be skipped by any single grouping, but only the second halfslot of the earlier slot and the first halfslot of the later slot.

When the access terminal 300 is implementing an autonomous traffic DTX operation in addition to the network DTX operation, the autonomous traffic DTX operation can be employed during the subframes that include data transmissions, while the network DTX operation can be employed during the subframes without data. The autonomous traffic DTX operation in this example may employ a fixed DTX pattern that covers similar halfslots so that the overhead channels carried in halfslots 0, 1, 2, and 7 are avoided. Furthermore, the autonomous traffic DTX operation employed with the network DTX operation can be similar to the fixed DTX pattern described above with reference to FIGS. 6 and 7, in that the autonomous traffic DTX operation is adapted to be suspended for a particular halfslot if there in an ACK scheduled to be transmitted during that halfslot, or during the associated halfslot following that halfslot.

FIG. 9 is a block diagram illustrating a fixed DTX pattern that may be applied in combination with the network DTX pattern in FIG. 8 for RRIs 5, 7, 9, and 10. Similar to the other diagrams, the shaded boxes are the boxes during which the transmitter circuit 312 is scheduled to be powered down. In this example, the halfslots scheduled to be punctured include halfslots 3 and 4 of subframe 0, halfslot 3 of subframe 1, halfslots 5 and 6 of subframe 2, and halfslots 5 and 6 of subframe 3. FIG. 10 is a block diagram illustrating a fixed DTX pattern that may be applied in combination with the network DTX pattern in FIG. 8 for RRIs 1-4, 6, 8, 11, and 12. In this example, all the same halfslots as FIG. 9 are scheduled to be punctured, with the addition of halfslot 4 of subframe 1.

In each of the previous examples of autonomous traffic DTX operations described above with reference to FIGS. 4-10, a substantially fixed DTX pattern is utilized, with some examples including the flexibility to override a scheduled DTX period in a particular slot or a particular portion of a slot if an ACK is scheduled to be transmitted in that slot or in that portion of the slot. In some instances, however, if the forward link has some percentage (X %) of slots assigned to the access terminal 300, then the same percentage (X %) of the reverse link slots will transmit an ACK. As a result, this same percentage (X %) of the scheduled DTX slots would be cancelled and the transmitter circuit 312 would remain powered up during these cancelled DTX slots. Such instances can result in relatively large duty cycles. As noted above, a duty cycle that is too large can result in the transmitter circuit 312 being powered up for too long a time, causing potentially less power savings.

In a further example of the present disclosure, the access terminal 300 can be adapted to employ an autonomous traffic DTX operation utilizing a selective pattern, where a determination to puncture a slot is made on a slot-by-slot basis. In this example, a fixed DTX pattern is not utilized. Instead, the access terminal 300 takes the first opportunity to puncture a slot in the subframe without degrading performance. The selection of a slot to be punctured is based on a set of rules. One or more common rules may apply to all slots. For example, one common rule is that a slot will not be punctured if there is an ACK transmission scheduled for the slot. Another common rule is that if there is an earlier slot in the same subframe that is already punctured, the pattern will not puncture another slot in that same subframe.

Additional rules may be dependent on the repetition pattern associated with the RRI used in the transmissions. Some examples of such rules are set forth below for a 7.5-slot RRI, an 8-slot RRI, a 10-slot RRI, and a 5-slot RRI.

Referring to FIG. 11, block diagrams are depicted illustrating a repetition pattern and a slot index for a 7.5-slot RRI, together with the specific slot rules employable when a network DTX operation is not implemented with the autonomous traffic DTX operation. Each block represents a halfslot in the top diagram on the left, and one slot in the top diagram on the right. As shown, in a 7.5-slot RRI halfslots 0 and 1 are repeated twice, and halfslots 2 through 14 are each repeated once. None of the blocks are shown shaded because the DTX pattern is not fixed, but is determined on-the-fly in accordance with whether or not an ACK is scheduled in a particular slot, whether or not an earlier slot in the same subframe has already been punctured, and according to slot-specific rules.

In this example, the access terminal 300 can determine whether a slot should be punctured according to the two common rules described above for all slots, and according to the specific slot rules, depicted in FIG. 11. In this and the subsequent examples, the notation A~!B is used to indicate that slot A is only punctured if slot B is not. Similarly, A~!B & !C is used to indicate that slot A is only punctured if slots B and C are both not punctured. The depicted rules are adapted to avoid completely puncturing all occurrences of any particular symbol. The specific slot rules apply in this example to slots 8 through 15. For example, in addition to the two common or general rules described above, slot 8 is punctured only if slot 1 is not, slot 9 is punctured only if slot 1 and slot 2 are not, slot 10 is punctured only if slot 2 and slot 3 are not punctured, slot 11 is punctured only if slots 3 and 4 are not, slot 12 is punctured only if slots 4 and 5 are not, slot 13 is punctured only if slots 5 and 6 are not, slot 14 is punctured only if slots 6 and 7 are not, and slot 15 is punctured only if either slot 0 is not or if slots 7 and 8 are not.

Turning to FIG. 12, block diagrams are depicted to illustrate a repetition pattern and slot index for an 8-slot RRI, together with the specific slot rules employable when a network DTX operation is not implemented with the autonomous traffic DTX operation. In an 8-slot RRI, all of the halfslot 0 through 15 are repeated once. In this example, in addition to the two common or general rules, slot 8 is punctured only if slot 0 is not, slot 9 is punctured only if slot 1 is not, slot 10 is punctured only if slot 2 is not, slot 11 is punctured only if slot 3 is not, slot 12 is punctured only is slot 4 is not, slot 13 is punctured only if slot 5 is not, slot 14 is punctured only if slot 6 is not, and slot 15 is punctured only if slot 7 is not.

Turning to FIG. 13, block diagrams are depicted to illustrate a repetition pattern and slot index for a 10-slot RRI, together with the specific slot rules employable when a network DTX operation is not implemented with the autonomous traffic DTX operation. In a 10-slot RRI, the halfslot 0 through 11 are repeated once. In this example, slots 6, 7, 8, and 9 cannot be punctured. Further, in addition to the two common rules, slot 10 is punctured only if slot 0 is not, slot 11 is punctured only if slot 1 is not, slot 12 is punctured only if slot 2 is not, slot 13 is punctured only if slot 3 is not, slot 14 is punctured only if slot 4 is not, and slot 15 is punctured only if slot 5 is not.

Turning to FIG. 14, block diagrams are depicted to illustrate a repetition pattern and slot index for a 5-slot RRI, together with the specific slot rules employable when a network DTX operation is not implemented with the autonomous traffic DTX operation. In this example, the 5-slot RRI is a TG12 RRI, meaning that the reverse link transmissions employ frames with only 12 slots, as compared to 16 slots in the other examples. Accordingly, only the first three subframes are considered. In a 5-slot RRI, the halfslot 0 through 3 are repeated twice, and the halfslots 4 through 9 are repeated twice. In this example, in addition to the two common rules, slot 5 is punctured only if slot 0 is not, slot 6 is punctured only if slot 1 is not, slot 7 is punctured only if slot 2 is not, slot 8 is punctured only if slot 3 is not, slot 9 is punctured only if slot 4 is not, slot 10 is punctured only if either slot 0 or slot 5 are not, and slot 11 is punctured only if either slot 1 or slot 6 are not.

These examples of rules may apply for the different RRI schemes when the autonomous traffic DTX operation is implemented by the access terminal 300 alone. That is, when a network DTX operation is not implemented in addition to the autonomous traffic DTX operation. However, when a network DTX operation is implemented together with the autonomous traffic DTX operation, different rules may be applied in making the slot-by-slot determination regarding puncturing.

Referring to FIG. 15, block diagrams are depicted illustrating a repetition pattern and a slot index for a 7.5-slot RRI, together with the specific slot rules employable when a network DTX operation is also implemented with the autonomous traffic DTX operation. Each block represents a halfslot in the top diagram on the left. In the top diagram on the right, each numbered block represents the second halfslot of a preceding slot and the first halfslot of a subsequent slot. In this example, in addition to the two common or general rules, slot 4 is punctured only if slot 0 and slot 1 are not, slot 5 is punctured only if slot 1 is not, slot 6 is punctured only if slot 2 and slot 3 are not, and slot 7 is punctured only if slot 3 is not.

Turning to FIG. 16, block diagrams are depicted to illustrate a repetition pattern and slot index for an 8-slot RRI, together with the specific slot rules employable when a network DTX operation is also implemented with the autonomous traffic DTX operation. In this example, in addition to the two common or general rules, slot 4 is punctured only if slot 0 is not, slot 5 is punctured only if slot 1 is not, slot 6 is punctured only if slot 2 is not, and slot 7 is punctured only if slot 3 is not.

Figures 17, 18:
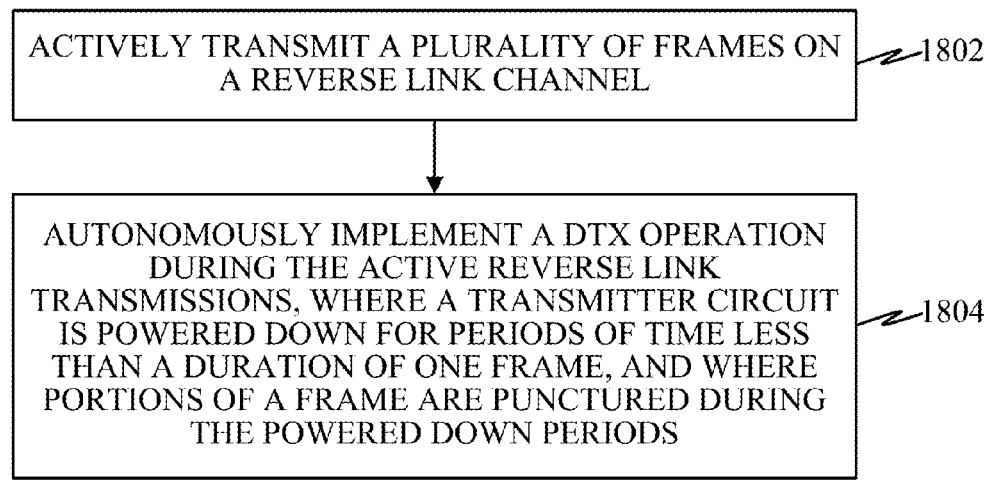
FIG. 17 includes block diagrams illustrating a repetition pattern and a slot index for a 10-slot RRI, together with the specific slot rules employable when a network DTX operation is also implemented with the autonomous traffic DTX operation according to some embodiments.
FIG. 18 is a flow diagram illustrating a method operational on an access terminal according to some embodiments.

Turning to FIG. 17, block diagrams are depicted to illustrate a repetition pattern and slot index for a 10-slot RRI, together with the specific slot rules employable when a network DTX operation is also implemented with the autonomous traffic DTX operation. In this example, slots 2 and 3 cannot be punctured. Further, in addition to the two common rules, it is unlikely that the access terminal 300 would be able to achieve a 25% puncturing rate. As a result, the access terminal 300 may choose to not use an autonomous traffic DTX operation utilizing slot-by-slot determinations when a network DTX operation is also employed.

Similarly, for a 5-slot RRI, the access terminal 300 may avoid an autonomous traffic DTX operation utilizing slot-by-slot determinations alongside a network DTX operation. This is because any puncturing from the slot-by-slot determinations can completely puncture identified symbols when utilized alongside the network DTX operation.

All of the forgoing operations and features may be implemented by the access terminal 300 at the processing circuit 302 (e.g., the DTX circuit/module 308) executing the DTX operations 310.

Further aspects of the present disclosure relate to methods operational on access terminals. Such methods may implement any or all of the various functions described above with reference to FIGS. 4-17. FIG. 18 is a flow diagram illustrating at least one example of a method operational on an access terminal, such as the access terminal 300. Referring to FIGS. 3 and 18, an access terminal 300 can actively transmit a plurality of frames on a reverse link channel, at 1802. For example, the processing circuit 302 may maintain an active reverse link transmission via the communications interface 304. Such an active reverse link may include a pilot channel for reverse link channel estimation, an overhead channel to support the traffic channel, and/or a data channel for reverse link data transmissions.

At 1804, the access terminal 300 can autonomously implement a DTX operation during the active reverse link transmissions. As noted previously, autonomous traffic DTX operations refers the access terminal 300 implementing the DTX operation without negotiation with the network, and potentially without the network having any knowledge that the autonomous DTX operation is being employed by the access terminal 300. The autonomous traffic DTX operation can be implemented by powering down the transmitter circuit 312 for periods of time less than a duration of one frame, essentially puncturing portions of the frame during the powered down periods. In at least one example, the processing circuit 302 (e.g., the DTX circuit/module 308) executing the DTX operations 310 can autonomously implement the traffic DTX operation during the active reverse link transmissions by powering down the transmitter circuit 312 (or at least a portion thereof) for periods of time less than a duration of one frame.

In some instances, processing circuit 302 (e.g., the DTX circuit/module 308) executing the DTX operations 310 may implement the autonomous traffic DTX operation by utilizing a fixed DTX pattern of powered down periods during a frame. Some examples of fixed DTX patterns that may be implemented by the processing circuit 302 (e.g., the DTX circuit/module 308) executing the DTX operations 310 are described hereinabove with reference to FIGS. 4-10.

In some examples, such as the examples described with reference to FIGS. 4 and 5, the processing circuit 302 (e.g., the DTX circuit/module 308) executing the DTX operations 310 can implement a fixed DTX pattern configured so the powered down periods do not occur in a first half of a slot. Such configurations can avoid puncturing an ACK transmission.

In some examples, such as the examples described with reference to the 7.5-slot RRI example in FIG. 4, and in the examples described with reference to FIGS. 5-10, the processing circuit 302 (e.g., the DTX circuit/module 308) executing the DTX operations 310 can implement a fixed DTX pattern configured to avoid puncturing all iterations of a repeated symbol in a frame. In the examples described with reference to FIG. 5, the processing circuit 302 (e.g., the DTX circuit/module 308) executing the DTX operations 310 may employ a first offset for the DTX pattern during a first portion of the frame, and a second offset, different from the first offset, for the DTX pattern during a second portion of the frame.

In some examples, such as the examples described with reference to FIGS. 6-10, the processing circuit 302 (e.g., the DTX circuit/module 308) executing the DTX operations 310 can implement a fixed DTX pattern including a plurality of slot-length powered down periods (e.g., DTX periods). In such examples, the processing circuit 302 (e.g., the DTX circuit/module 308) executing the DTX operations 310 can cancel a powered down period, or at least a portion thereof, when an ACK transmission is scheduled during the powered down period.

In further instances, the processing circuit 302 (e.g., the DTX circuit/module 308) executing the DTX operations 310 may implement the autonomous traffic DTX operation by determining whether to puncture a slot based on a slot-by-slot analysis. Such an analysis may include a determination to not puncture a slot when puncturing the slot would result in completely puncturing all iterations of a repeated symbol in a frame. According to at least some examples, the processing circuit 302 (e.g., the DTX circuit/module 308) executing the DTX operations 310 may perform any of the algorithms set forth herein with reference to FIGS. 11-17 to determine whether to puncture a slot on a slot-by-slot basis.

Furthermore, the processing circuit 302 (e.g., the DTX circuit/module 308) executing the DTX operations 310 can autonomously implement the autonomous traffic DTX operation in addition to a network DTX operation. That is, the processing circuit 302 (e.g., the DTX circuit/module 308) executing the DTX operations 310 can employ both the autonomous traffic DTX operation and a network DTX operation at substantially the same time, as described herein.

By implementing one or more aspects of the present disclosure, access terminals can reduce power consumption, as well as obtain other benefits, by autonomously implementing traffic DTX operations. Such autonomous traffic DTX operations can reduce the amount of time that the transmitter circuit is powered on, even during active transmissions.

While the above discussed aspects, arrangements, and embodiments are discussed with specific details and particularity, one or more of the components, steps, features and/or functions illustrated in FIGS. 1, 2, 3, 4, 5, 6, 7, 8, 9, 10, 11, 12, 13, 14, 15, 16, 17, 18, and/or 19 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1 and/or 3 may be configured to perform or employ one or more of the methods, features, parameters, and/or steps described in FIGS. 2, 4, 5, 6, 7, 8, 9, 10, 11, 12, 13, 14, 15, 16, 17, 18, and/or 19. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claims is:

1. An access terminal, comprising:
   a communications interface including a transmitter circuit; and
   a processing circuit coupled to the communications interface, the processing circuit adapted to:
   actively transmit via the transmitter circuit a plurality of frames on a reverse link channel; and
   autonomously implement a discontinuous transmission (DTX) operation during active reverse link transmissions, wherein the transmitter circuit is powered down for a duration of a slot, and reverse link transmissions are punctured during the powered down periods, and wherein a determination to puncture at least one slot in a subframe is based on slot-specific rules whether an earlier slot in the subframe was punctured.

2. The access terminal of claim 1, wherein the processing circuit is adapted to: determine to not puncture the at least one slot when puncturing the at least one slot would result in puncturing all iterations of a repeated symbol in the subframe.

3. The access terminal of claim 1, wherein the processing circuit is adapted to autonomously implement the DTX operation in addition to a network DTX operation.

4. The access terminal of claim 1, wherein the determination to puncture the at least one slot in the subframe is further based on whether an acknowledgment (ACK) transmission is scheduled for the slot.

5. The access terminal of claim 1, wherein the determination to puncture the at least one slot in the subframe is dependent on a repetition pattern associated with a reverse-link rate index (RRI) employed to actively transmit the plurality of frames on the reverse link channel via the transmitter circuit.

6. A method operational on an access terminal, comprising:
   actively transmitting a plurality of frames on a reverse link channel; and
   autonomously implementing a discontinuous transmission (DTX) operation during active reverse link transmissions;
   powering down a transmitter circuit for periods of time less than a duration of one frame, and puncturing portions of a frame during the powered down periods; and determining whether to puncture at least one portion of the frame according to portion-specific rules based on whether an earlier portion in the frame was punctured.

7. The method of claim 6, wherein powering down a transmitter circuit for periods of time less than a duration of one frame comprises:
utilizing slot-length powered down periods; and
cancelling a powered down period when an acknowledgment (ACK) transmission is scheduled during the powered down period.

8. The method of claim 6, wherein determining whether to puncture at least one portion of the frame based on whether an earlier portion in the frame was punctured comprises:
utilizing slot-length powered down periods; and
determining to not puncture a slot when puncturing the slot would result in puncturing all iterations of a repeated symbol in the frame.

9. The method of claim 6, wherein autonomously implementing the DTX operation comprises:
autonomously implementing the DTX operation in addition to implementing a network DTX operation.

10. The method of claim 6, wherein determining whether to puncture the at least one portion of the frame further comprises:
determining a reverse-link rate index (RRI) employed to actively transmit the plurality of frames on the reverse link channel; and
determining whether to puncture the at least one portion of the frame based on a repetition pattern associated with the determined RRI.

11. An access terminal, comprising:
means for actively transmitting a plurality of frames on a reverse link channel; and
means for autonomously implementing a discontinuous transmission (DTX) operation during the active reverse link transmissions, wherein a transmitter circuit is powered down for periods of time less than a duration of one frame, and portions of a frame are punctured during the powered down periods, and
means for determining whether to puncture at least one portion of the frame according to portion-specific rules based on whether an earlier portion in the frame was punctured.

12. The access terminal of claim 11, wherein determining whether to puncture the at least one portion of the frame based on whether an earlier portion in the frame was punctured comprises determining to not puncture a slot when puncturing the slot would result in completely puncturing all iterations of a repeated symbol in the frame.

13. The access terminal of claim 11, further comprising: means for implementing a network DTX operation in addition to the autonomously implemented DTX operation.

14. The access terminal of claim 11, wherein determining whether to puncture the at least one portion of the frame is further based on whether an acknowledgment (ACK) transmission is scheduled for the at least one portion.

15. The access terminal of claim 11, wherein determining whether to puncture the at least one portion of the frame further comprises:
determining a reverse-link rate index (RRI) employed to actively transmit the plurality of frames on the reverse link channel; and
determining whether to puncture the at least one portion of the frame based on a repetition pattern associated with the determined RRI.

16. A non-transitory processor-readable storage medium, comprising programming for causing a processing circuit to:
actively transmit a plurality of frames on a reverse link channel; and
autonomously implement a discontinuous transmission (DTX) operation during the active reverse link transmissions, wherein a transmitter circuit is powered down for a duration of a slot, and portions of a frame are punctured during the powered down periods;
and determine to puncture at least one slot in the frame based on slot-specific rules whether an earlier slot in the frame was punctured.

17. The processor-readable storage medium of claim 16, wherein the determination to puncture each the at least one slot based on slot-specific rules whether an earlier slot in the frame was punctured is configured to avoid puncturing a slot when puncturing the slot would result in completely puncturing all iterations of a repeated symbol in a frame.

18. The processor-readable storage medium of claim 16, further comprising programming for causing a processing circuit to: implement a network DTX operation in addition to the autonomously implemented DTX operation.

19. The processor-readable storage medium of claim 16, wherein the determination to puncture the at least one slot in the frame is further based on whether an acknowledgment (ACK) transmission is scheduled for the slot.

20. The processor-readable storage medium of claim 16, wherein the determination to puncture the at least one slot in the frame is dependent on a repetition pattern associated with a reverse-link rate index (RRI) employed to actively transmit the plurality of frames on the reverse link channel.

* * * * *